(12) United States Patent
Turner et al.

(10) Patent No.: US 11,377,957 B2
(45) Date of Patent: Jul. 5, 2022

(54) GAS TURBINE ENGINE WITH A DIFFUSER CAVITY COOLED COMPRESSOR

(71) Applicant: General Electric Company, Schenectady, NY (US)

(72) Inventors: Alan Glenn Turner, Cincinnati, OH (US); Monty Lee Shelton, Loveland, OH (US); Anand Roday, Mason, OH (US); Aigbedion Akwara, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 55 days.

(21) Appl. No.: 15/590,363

(22) Filed: May 9, 2017

(65) Prior Publication Data
US 2018/0328177 A1    Nov. 15, 2018

(51) Int. Cl.
*F01D 5/08*  (2006.01)
*F01D 25/12* (2006.01)
(Continued)

(52) U.S. Cl.
CPC ............ *F01D 5/084* (2013.01); *F01D 25/12* (2013.01); *F02C 7/18* (2013.01); *F02C 7/28* (2013.01);
(Continued)

(58) Field of Classification Search
CPC ..... F05D 2220/3219; F05D 2220/3218; F05D 2220/3217; F05D 2220/3216;
(Continued)

(56) References Cited

U.S. PATENT DOCUMENTS 4,920,741 A * 5/1990 Liebl .................... F02C 7/18
60/785
5,163,285 A * 11/1992 Mazeaud ............... F02C 7/185
60/806

(Continued)

FOREIGN PATENT DOCUMENTS

CN      103375200 A      10/2013
FR      2881794 A1 *     8/2006 ............. F01D 5/081

OTHER PUBLICATIONS

Chinese Office Action Corresponding to Application No. 201810438303 dated Mar. 20, 2020.

*Primary Examiner* — Stephanie Sebasco Cheng
(74) *Attorney, Agent, or Firm* — Dority & Manning, P.A.

(57) ABSTRACT

A gas turbine engine includes a compressor section having a high pressure compressor, the high pressure compressor including an aft-most compressor stage. The gas turbine engine also includes a combustion section having a stage of discharge nozzles, the stage of discharge nozzles located downstream of the aft-most compressor stage and upstream of a diffuser cavity. The gas turbine engine also includes a high pressure spool drivingly coupled to the high pressure compressor, the high pressure spool forming in part a compressor discharge pressure seal and including a forward spool section. The forward spool section extends between the compressor discharge pressure seal and the aft-most compressor stage, the forward spool section defining an airflow cavity for providing a cooling airflow from the diffuser cavity to the aft-most compressor stage.

20 Claims, 8 Drawing Sheets

(51) Int. Cl.
*F02C 7/28* (2006.01)
*F02C 7/18* (2006.01)

(52) U.S. Cl.
CPC ...... *F01D 5/082* (2013.01); *F05D 2220/3216* (2013.01); *F05D 2220/3219* (2013.01); *F05D 2240/55* (2013.01); *F05D 2260/22141* (2013.01)

(58) Field of Classification Search
CPC ....... F05D 2240/55–57; F05D 2240/59; F05D 2240/57–59; F05D 2240/60–63; F05D 2260/221–231; F01D 5/082; F01D 5/084; F01D 5/085; F01D 5/087; F01D 5/088; F01D 5/018; F01D 5/181; F01D 5/182; F01D 5/184; F01D 5/186; F01D 5/187; F01D 5/188; F01D 5/89; F01D 11/005; F01D 5/026; F01D 11/003; F01D 11/02; F01D 11/025; F01D 5/081–088; F01D 5/06; F02C 7/18; F02C 7/28
See application file for complete search history.

(56) References Cited

U.S. PATENT DOCUMENTS

| | | | |
|---|---|---|---|
| 5,236,302 A * | 8/1993 | Weisgerber | ........... F01D 11/001 415/173.7 |
| 5,685,158 A | 11/1997 | Lenahan et al. | |
| 6,305,157 B1 | 10/2001 | Rakhmailov | |
| 6,540,477 B2 | 4/2003 | Glynn et al. | |
| 6,672,072 B1 * | 1/2004 | Giffin, III | ................. F01D 5/08 60/728 |
| 7,296,415 B2 * | 11/2007 | Coulon | ................. F01D 11/025 415/170.1 |
| 8,256,229 B2 | 9/2012 | Glahn et al. | |
| 8,402,770 B2 * | 3/2013 | Garin | ...................... F01D 25/12 60/806 |
| 8,459,040 B2 | 6/2013 | Glahn et al. | |
| 8,800,290 B2 * | 8/2014 | Burd | ........................ F02C 3/14 60/737 |
| 8,973,371 B2 | 3/2015 | King et al. | |
| 8,979,482 B2 | 3/2015 | Khanin et al. | |
| 9,091,172 B2 | 7/2015 | Wolfgram et al. | |
| 9,267,513 B2 * | 2/2016 | Giametta | ................ F02C 7/185 |
| 10,036,256 B2 * | 7/2018 | Kowalski | ................ F01D 5/081 |
| 10,233,840 B2 * | 3/2019 | Hiester | .................... F02C 7/143 |
| 10,253,632 B2 * | 4/2019 | Lyons | ..................... F01D 5/081 |
| 10,253,976 B2 * | 4/2019 | Gunderson | ........... F23D 11/383 |
| 10,830,146 B2 * | 11/2020 | Yin | ........................ F01D 5/081 |
| 2013/0280040 A1 * | 10/2013 | Johns | ..................... F01D 5/188 415/115 |
| 2014/0161598 A1 * | 6/2014 | Hanley | .................. F01D 5/046 415/177 |
| 2016/0076381 A1 | 3/2016 | Suciu et al. | |
| 2016/0090914 A1 | 3/2016 | Lyons | |
| 2016/0146016 A1 | 5/2016 | Johns et al. | |
| 2016/0222982 A1 | 8/2016 | Powell et al. | |
| 2016/0312615 A1 | 10/2016 | Lyons | |

* cited by examiner

GAS TURBINE ENGINE WITH A DIFFUSER CAVITY COOLED COMPRESSOR

FIELD

The present subject matter relates generally to a gas turbine engine, or more particularly to a gas turbine engine having a cooled compressor.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

During operation of the gas turbine engine, certain components within a core air flowpath of the core may be exposed to relatively elevated temperatures. For example, the compressor section may include a plurality of stages, with each stage including a plurality of compressor rotor blades coupled to a respective rotor. The rotor may generally include a rim, to which the plurality of compressor rotor blades are coupled, and a bore extending radially inward from the rim. During operation, the rim may increase in temperature relative to the bore by virtue of its exposure, or proximity, to the core air flowpath. Such a temperature differential across the rotor may create undesirable thermal stresses within the rotor. Accordingly, gas turbine engine having one or more features for reducing a temperature differential of a rotor within a compressor section would be useful.

BRIEF DESCRIPTION

Aspects and advantages of the invention will be set forth in part in the following description, or may be obvious from the description, or may be learned through practice of the invention.

In one exemplary embodiment of the present disclosure, a gas turbine engine is provided defining a radial direction. The gas turbine engine includes a compressor section including a high pressure compressor, the high pressure compressor including an aft-most compressor stage. The gas turbine engine also includes a combustion section defining a diffuser cavity and including a stage of discharge nozzles, the stage of discharge nozzles located downstream of the aft-most compressor stage and upstream of the diffuser cavity. The gas turbine engine also includes a high pressure spool drivingly coupled to the high pressure compressor, the high pressure spool forming in part a compressor discharge pressure seal and including a forward spool section. The forward spool section extends between the compressor discharge pressure seal and the aft-most compressor stage, the forward spool section defining an airflow cavity for providing a cooling airflow from the diffuser cavity to the aft-most compressor stage.

In certain exemplary embodiments the combustion section further includes a support assembly having at least a portion positioned inward of the stage of discharge nozzles along the radial direction.

For example, in certain exemplary embodiments the high pressure spool forms the compressor discharge pressure seal with the support assembly of the combustion section.

For example, in certain exemplary embodiments the support assembly includes an inner discharge nozzle case, wherein the inner discharge nozzle case defines an opening for providing the cooling airflow to the airflow cavity of the forward spool section. For example, in certain exemplary embodiments the inner discharge nozzle case includes an inducer positioned in the opening defined by the inner discharge nozzle case.

For example, in certain exemplary embodiments the inner discharge nozzle case defines an opening for providing the airflow cavity of the forward spool section with the cooling airflow, and wherein the high pressure spool forms an auxiliary seal with the support assembly of the combustion section opposite the opening of the inner discharge nozzle case from the compressor discharge pressure seal.

In certain exemplary embodiments the forward spool section includes a forward spool member and a shield member, wherein the shield member is positioned adjacent to the forward spool member, and wherein the shield member and forward spool member together define the airflow cavity. For example, in certain exemplary embodiments the aft-most compressor stage includes a rim, and wherein the shield member extends from the compressor discharge pressure seal to the rim of the aft-most compressor stage. For example, in certain exemplary embodiments the shield member defines an opening for receiving the cooling airflow from the diffuser cavity.

In certain exemplary embodiments the aft-most compressor stage includes a rim, wherein the rim define a passage extending from an aft end of the rim, wherein the aft-most compressor stage includes a compressor rotor blade, wherein the compressor rotor blade defines an internal cavity and a plurality of cooling holes, wherein the internal cavity of the compressor rotor blade is in airflow communication with the passage, and wherein the airflow cavity defined by the forward spool section is in airflow communication with the passage of the rim.

In certain exemplary embodiments the aft-most compressor stage includes a rim, wherein the rim defines a passage extending from an aft end of the rim to a forward end of the rim, and wherein the airflow cavity defined by the forward spool section is in airflow communication with the passage of the rim.

In certain exemplary embodiments the gas turbine engine further includes a turbine section having a high pressure turbine, wherein the high pressure spool is further drivingly connected to the high pressure turbine.

In an exemplary aspect of the present disclosure, a method of cooling a compressor of a gas turbine engine is provided. The method includes providing a flow of compressed air from a compressor of a compressor section to a diffuser cavity through a stage of discharge nozzles. The method also includes providing a cooling airflow from the diffuser cavity to a cooling air passage defined in a forward spool section of a high pressure spool, the high pressure spool drivingly connected to the compressor. The method also includes providing the cooling airflow from the cooling air passage to an aft-most compressor stage of the compressor of the compressor section to cool the aft-most compressor stage of the compressor.

In certain exemplary aspects providing the cooling airflow from the cooling air passage to the aft-most compressor stage of the compressor includes providing the cooling airflow from the cooling air passage to a rim of the aft-most compressor stage of the compressor. For example, in certain exemplary aspects the rim defines a passage extending from an aft end of the rim to a forward end of the rim, and wherein the airflow cavity defined in the forward spool section is in airflow communication with the passage of the rim. For example, in certain exemplary aspects the rim defines a passage extending from an aft end of the rim, wherein the aft-most compressor stage includes a compressor rotor blade, wherein the compressor rotor blade defines an internal cavity and a plurality of cooling holes, and wherein providing the cooling airflow from the cooling air passage to the rim of the aft-most compressor stage includes providing the cooling airflow from the cooling air passage to the internal cavity of the compressor rotor blade through the passage defined by the rim.

In certain exemplary aspects providing the cooling airflow from the diffuser cavity to the cooling air passage defined in the forward spool section of the high pressure spool includes providing the cooling airflow through an opening in a discharge nozzle case to the cooling air passage defined in the forward spool section of the high pressure spool, the discharge nozzle case supporting the stage of discharge nozzles. For example, in certain exemplary aspects the inner discharge nozzle case includes an inducer positioned in the opening defined by the inner discharge nozzle case.

In certain exemplary aspects the forward spool section includes a forward spool member and a shield member, wherein the shield member is positioned adjacent to the forward spool member, and wherein the shield member and forward spool member together define the airflow cavity. For example, in certain exemplary aspects the shield defines an opening for receiving the cooling airflow from the diffuser cavity.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin. Here and throughout the specification and claims, range limitations are combined and interchanged, such ranges are identified and include all the sub-ranges contained therein unless context or language indicates otherwise.

Figure 1:
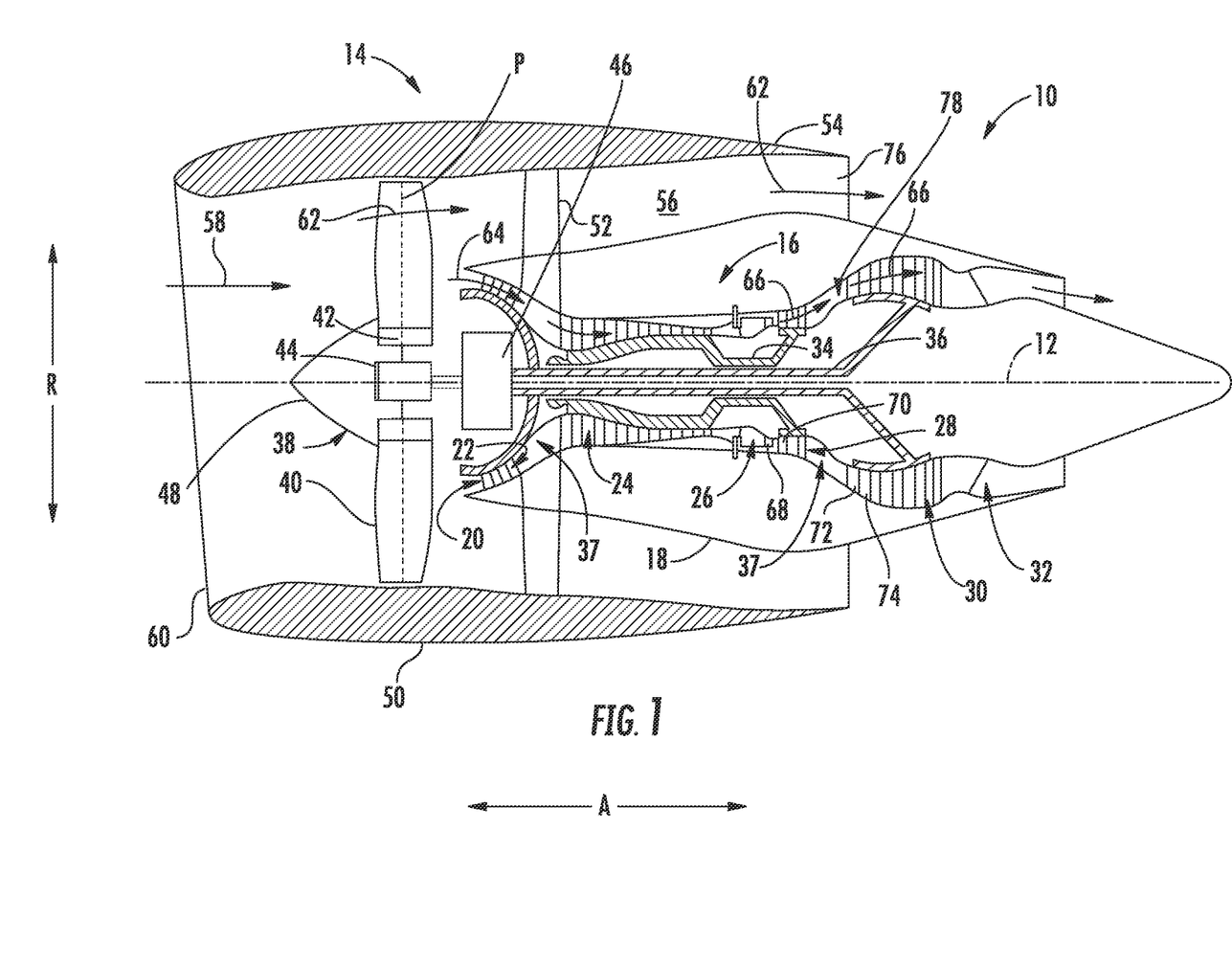
FIG. 1 is a schematic, cross-sectional view of an exemplary gas turbine engine according to various embodiments of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. Additionally, the compressor section, combustion section 26, and turbine section together define at least in part a core air flowpath 37 extending therethrough.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is, for the embodiment depicted, supported relative to the turbomachine 16 by a plurality of circumferentially-spaced outlet guide vanes 52. Additionally, a downstream section 54 of the nacelle 50 extends over an outer portion of the turbomachine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the turbofan engine 10 may be a direct drive turbofan engine (i.e., not including the power gearbox 46), may include a fixed pitch fan 38, etc. Additionally, or alternatively, aspects of the present disclosure may be incorporated into any other suitable gas turbine engine, such as a turboshaft engine, turboprop engine, turbojet engine, a land-based gas turbine engine for power generation, an aeroderivative gas turbine engine, etc.

Figure 2:
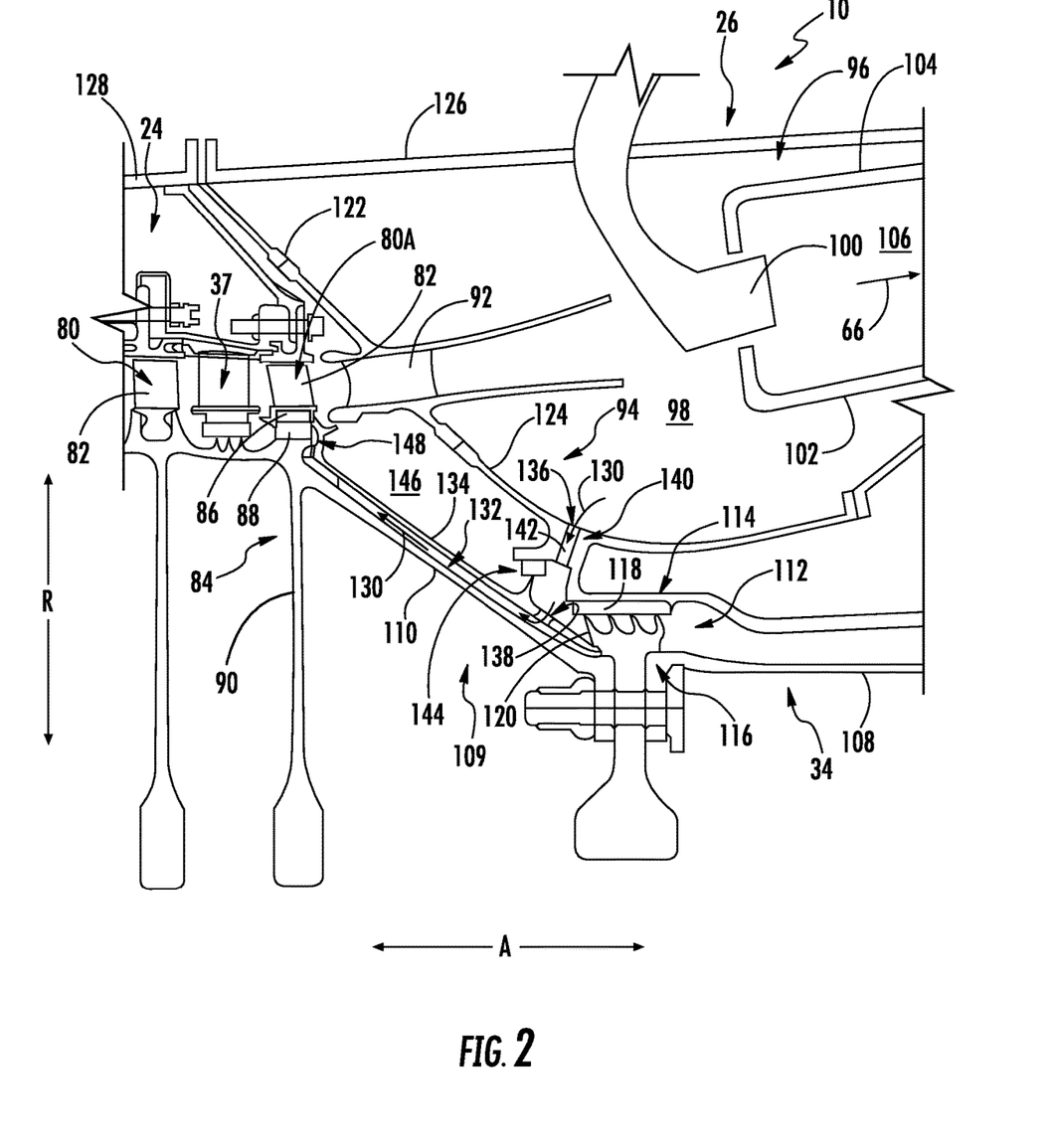
FIG. 2 is a close-up, cross-sectional, schematic view of a compressor section and a combustion section of the exemplary gas turbine engine of FIG. 1.

Referring now to FIG. 2, a schematic, cross-sectional view is provided of a portion of the compressor section and of the combustion section 26 of the exemplary turbofan engine 10 of FIG. 1. More specifically, FIG. 2 depicts an aft end of the HP compressor 24 of the compressor section, in addition to the combustion section 26.

As noted above, during operation of the turbofan engine 10, an airflow through the core air flowpath 37 of the turbofan engine 10 is sequentially compressed as it flows through the compressor section, or more specifically, as it flows through the LP compressor 22 and the HP compressor 24. The compressed air from the compressor section is then provided to the combustion section 26, wherein at least a portion of the compressed air is mixed with fuel and burned to create the combustion gases 66. The combustion gases 66 flow from the combustion section 26 to the turbine section, and more specifically, sequentially through the HP turbine 28 and the LP turbine 30, for the embodiment depicted, driving the HP turbine 28 and the LP turbine 30 (see FIG. 1). The HP spool 34 is drivingly coupled to both the HP turbine 28 and the HP compressor 24.

Referring particularly to FIG. 2, the HP compressor 24 includes a plurality of compressor stages 80, with each compressor stage 80 including, e.g., a plurality of HP compressor rotor blades 82 and a rotor 84. Each of the various compressor stages 80 is drivingly coupled to the HP spool 34, such that the HP turbine 28 may drive the HP compressor 24 through the HP spool 34. Amongst the plurality of compressor stages 80 of HP compressor 24, is an aft-most compressor stage 80A located at an aft end of the HP compressor 24. The compressor rotor blades 82 of the aft-most compressor stage 80A each include a base 86 attached to the respective rotor 84 of the aft-most compressor stage 80A. The rotor 84 of the aft-most compressor stage 80A includes a rim 88 and a bore 90, with the bore 90 extending inwardly generally along the radial direction R.

The aft-most compressor stage 80A provides compressed air to the combustion section 26. More specifically, for the embodiment depicted, the combustion section 26 includes a stage of discharge nozzles 92, a support assembly 94, and a combustor assembly 96. Further, the combustion section 26 defines a diffuser cavity 98, with the stage of discharge nozzles 92 located downstream of the aft-most compressor stage 80A of the HP compressor 24 and upstream of the diffuser cavity 98, such that compressor air from the aft-most compressor stage 80A is provided to the diffuser cavity 98 through the stage of discharge nozzles 92. The compressed air within the diffuser cavity 98 is, in turn, provided to the combustor assembly 96, where it is mixed with fuel and burned to generate the combustion gases 66. As is depicted, the combustor assembly 96 generally includes a fuel nozzle 100, an inner liner 102, and an outer liner 104, with the inner and outer liners 102, 104 together forming a combustion chamber 106. It should be appreciated that the combustor assembly 96 may be configured as any suitable combustor assembly 96 for the turbofan engine 10. For example, in certain embodiments, the combustor assembly 96 may be configured as an annular combustor assembly, a can combustor assembly, or a cannular combustor assembly.

Referring still to FIG. 2, as previously noted, the HP spool 34 is drivingly connected to the HP compressor 24. For the embodiment depicted, the HP spool 34 generally includes a central spool section including a central spool member 108 and a forward spool section 109 including a forward spool member 110. The central spool member 108 extends, for the embodiment depicted generally along the axial direction A at a location radially inward of the combustor assembly 96 of the combustion section 26. In certain exemplary embodiments, the central spool member 108 may define a substantially cylindrical shape. The forward spool member 110 extends generally from the central spool member 108 to the aft-most compressor stage 80A of the HP compressor 24 of the compressor section. More particularly, for the embodiment depicted, the HP spool 34 forms, in part, a compressor discharge pressure seal 112, and the forward spool member 110 of the forward spool section 109 extends between the compressor discharge pressure seal 112 and the aft-most compressor stage 80A.

Further, as is depicted, for the embodiment of FIG. 2, the support assembly 94 of the combustion section 26 also forms in part the compressor discharge pressure seal 112, such that the HP spool 34 forms the compressor discharge pressure seal 112 with the support assembly 94 of the combustion section 26. As is depicted, the support assembly 94 forms a stator portion 114 of the compressor discharge pressure seal 112 and the HP spool 34 forms a rotor portion 116 of the compressor discharge pressure seal 112 (the rotor portion 116 being rotatable relative to the stator portion 114). The stator portion 114 generally includes a seal pad 118 and the rotor portion 116 generally includes a plurality of seal teeth 120 configured to form a seal with the seal pad 118. It should be appreciated, however, that in other exemplary embodiments, the compressor discharge pressure seal 112 may have any other suitable configuration.

Referring still to FIG. 2, it will be appreciated that the support assembly 94 of the combustion section 26 is further configured for supporting the stage of discharge nozzles 92 and includes at least a portion positioned inward of the stage of discharge nozzles 92 along the radial direction R. More specifically, the support assembly 94 generally includes an outer discharge nozzle case 122 and an inner discharge nozzle case 124. The outer discharge nozzle case 122 extends from the stage of discharge nozzles 92 generally outwardly along the radial direction R and forward along the axial direction A. For the embodiment depicted, the outer discharge nozzle case 122 is coupled to an outer combustor casing 126 and an outer compressor casing 128. However, in other embodiments the outer discharge nozzle case 122 may be coupled to any other suitable component of the turbofan engine 10.

By contrast, the inner discharge nozzle case 124 extends from the stage of discharge nozzles 92 generally inwardly along the radial direction R and aft along the axial direction A. The stator portion 114 of the compressor discharge pressure seal 112 is coupled to, or formed integrally with, the inner discharge nozzle case 124.

Figure 3:
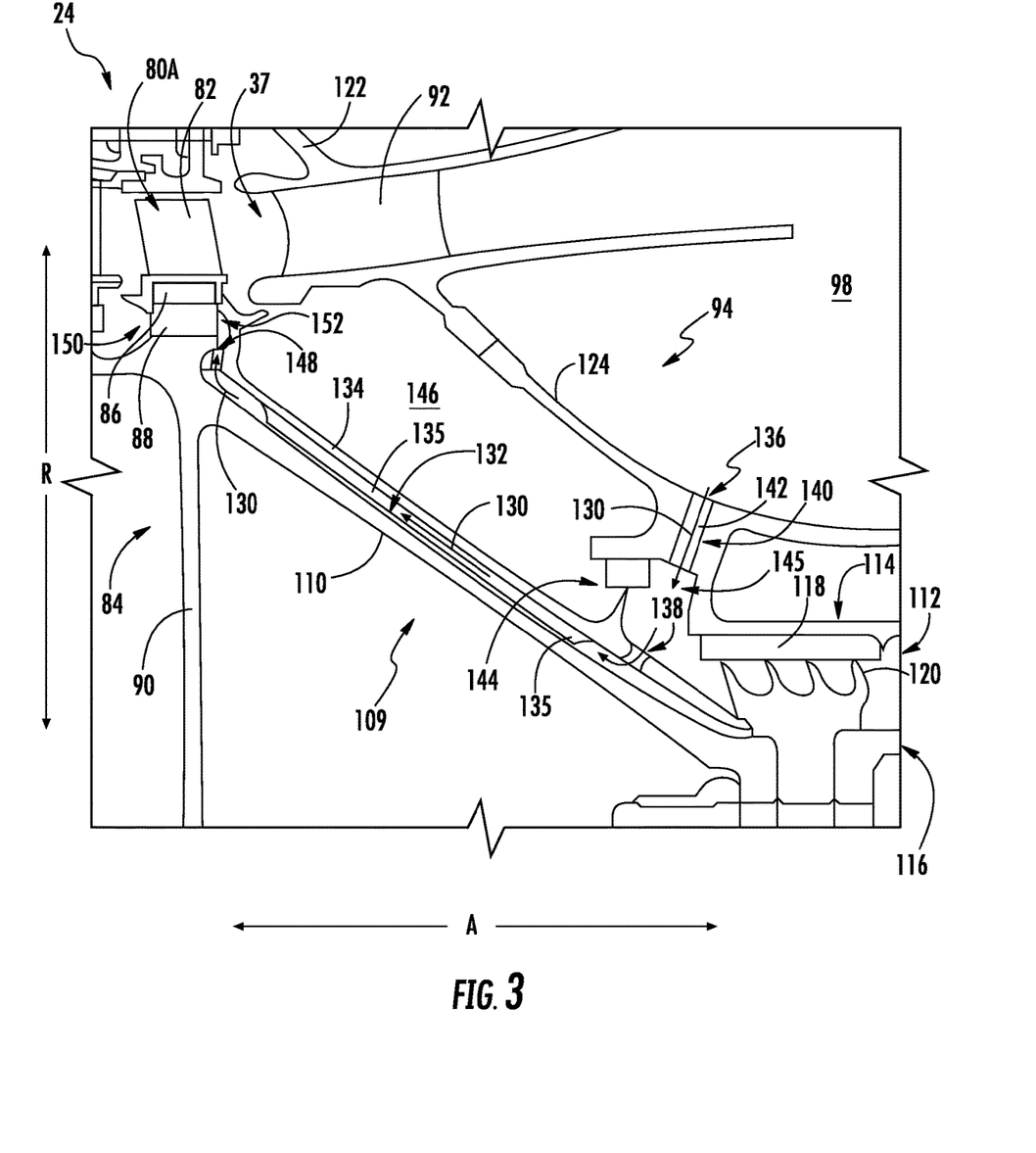
FIG. 3 is a close-up, cross-sectional, schematic view of an aft end of the compressor section and of a forward end of the combustion section of the exemplary gas turbine engine of FIG. 1.

Referring now also to FIG. 3, a close-up view of an aft portion of the HP compressor 24 of the compressor section and a forward portion of the combustion section 26 is provided. As will be described in greater detail, the exemplary turbofan engine 10 depicted generally defines a path for providing a cooling airflow 130 from the diffuser cavity 98 back to the rim 88 of the aft-most compressor stage 80A.

As is depicted, for the embodiment of FIG. 3 the forward spool section 109 defines an airflow cavity 132 for providing the cooling airflow 130 from the diffuser cavity 98 to the aft-most compressor stage 80A. More particularly, the forward spool member 110 of the forward spool section 109 defines at least in part the airflow cavity 132, and the forward spool section 109 further includes a shield member 134 positioned adjacent to the forward spool member 110 that also defines at least in part the airflow cavity 132. The forward spool member 110 and the shield member 134 together define the airflow cavity 132. For the embodiment depicted, the shield member 134 extends along an entire length of the forward spool member 110 from the rotor portion 116 of the compressor discharge pressure seal 112 to the rim 88 of the aft-most compressor stage 80A. Also for the embodiment depicted, the shield member 134 may further extend circumferentially with the forward spool member 110 (i.e., may extend about the axial direction A), such that the airflow cavity 132 defined therebetween is substantially annular. Further for the embodiment depicted, the shield member 134 includes one or more fins 135 extending longitudinally along a length of the shield member 134. The fins 135 may act to straighten the cooling airflow 130 flowing therethrough such that it more efficiently reaches the aft-most compressor stage 80A. Although not depicted, the fins 135 may be spaced circumferentially.

It should be appreciated that although for the embodiment depicted the airflow cavity 132 is defined by both the forward spool member 110 and the shield member 134, in other exemplary embodiments, the forward spool section 109 of the HP spool 34 may have any other suitable configuration for defining the airflow cavity 132. For example, in other exemplary embodiments, the airflow cavity 132 may instead be defined completely within the forward spool member 110. Additionally, it should be appreciated that the shield member 134 may have any suitable configuration for defining the airflow cavity 132 with the forward spool member 110. For example, in other exemplary embodiments, the shield member 134 may be configured as a plurality of shield members 134 defining a respective plurality of airflow cavities 132 spaced, e.g., circumferentially about the axial direction A.

Referring still to FIG. 3, for the embodiment depicted, the inner discharge nozzle case 124 defines a case opening 136 for providing the cooling airflow 130 from the diffuser cavity 98 to the airflow cavity 132 of the forward spool section 109. More specifically, the forward spool section 109, or rather the shield member 134, additionally defines a spool opening 138 for receiving the cooling airflow 130 from the diffuser cavity 98 provided through the case opening 136 in the inner discharge nozzle case 124. For the embodiment depicted, the inner discharge nozzle case 124 further includes an inducer 140 positioned in the case opening 136 defined by the inner discharge nozzle case 124. The inducer 140 may at least partially begin rotating the cooling airflow 130 from the diffuser cavity 98 in the same rotational direction that the HP spool 34 is rotating. For example, the inducer 140 of the inner discharge nozzle case 124 may include a plurality of airfoil-shaped members 142 oriented to turn the cooling airflow 130 flowing therethrough in a circumferential direction (i.e., in a direction extending about the axial direction A).

Further, for the embodiment depicted, the support assembly 94 and HP spool 34 together form an auxiliary seal 144. The auxiliary seal 144 is positioned forward of each of the case opening 136 of the inner discharge nozzle case 124 and the compressor discharge pressure seal 112, and also forward of each of the spool opening 138 of the shield member 134 and the compressor discharge pressure seal 112. The auxiliary seal 144 effectively defines a passage 145 between the inner discharge nozzle case 124 and the HP spool 34, the passage 145 allowing for the cooling airflow 130 to flow directly from the diffuser cavity 98 to the airflow cavity 132. More specifically, the passage 145 is a dedicated flowpath for the cooling airflow 130, separate from a cavity 146 positioned adjacent to the core air flowpath 37.

As is depicted, the airflow cavity 132 of the HP spool 34 is in airflow communication with the rim 88 of the aft-most compressor stage 80A. More particularly, the airflow cavity 132 of the HP spool 34 is in airflow communication with, and defines an outlet 148 positioned adjacent to, the rim 88 of the aft-most compressor stage 80A. More particularly, still, the rim 88 of the aft-most compressor stage 80A defines a forward end 150 and an aft end 152. The outlet 148 of the airflow cavity 132 of the HP spool 34 is positioned adjacent to the aft end 152 of the rim 88. The cooling airflow 130 from the airflow cavity 132 of the HP spool 34 accordingly may generally flow around the rim 88 of the aft-most compressor stage 80A to cool the rim 88 of the aft-most compressor stage 80A.

Such a configuration may assist with maintaining a temperature of the rim 88 within a desired operating temperature range. For example, such a configuration may reduce a temperature differential between the rim 88 of the rotor 84 and the bore 90 the rotor 84 of the aft-most compressor stage 80A. Reducing the temperature differential may therefore reduce an amount of thermal stress on the rotor 84 of the aft-most compressor stage 80A during operation of the turbofan engine 10. Further, inclusion of the auxiliary seal 144 may reduce a likelihood that relatively hot, high pressure air from the aft-most compressor stage 80A enters the cavity 146 and interacts with the cooling airflow 130 provided to the airflow cavity 132 of the HP spool 34, heating the cooling airflow 130 and reducing its effectiveness.

It should be appreciated, however, that in other embodiments, any other suitable configuration may be provided. For example, as previously stated, in other embodiments, any other suitable gas turbine engine may be provided. Additionally, in other exemplary embodiments, one or more of the components described herein may not be included, or alternatively, one or more components not described herein may be included.

Figure 4:
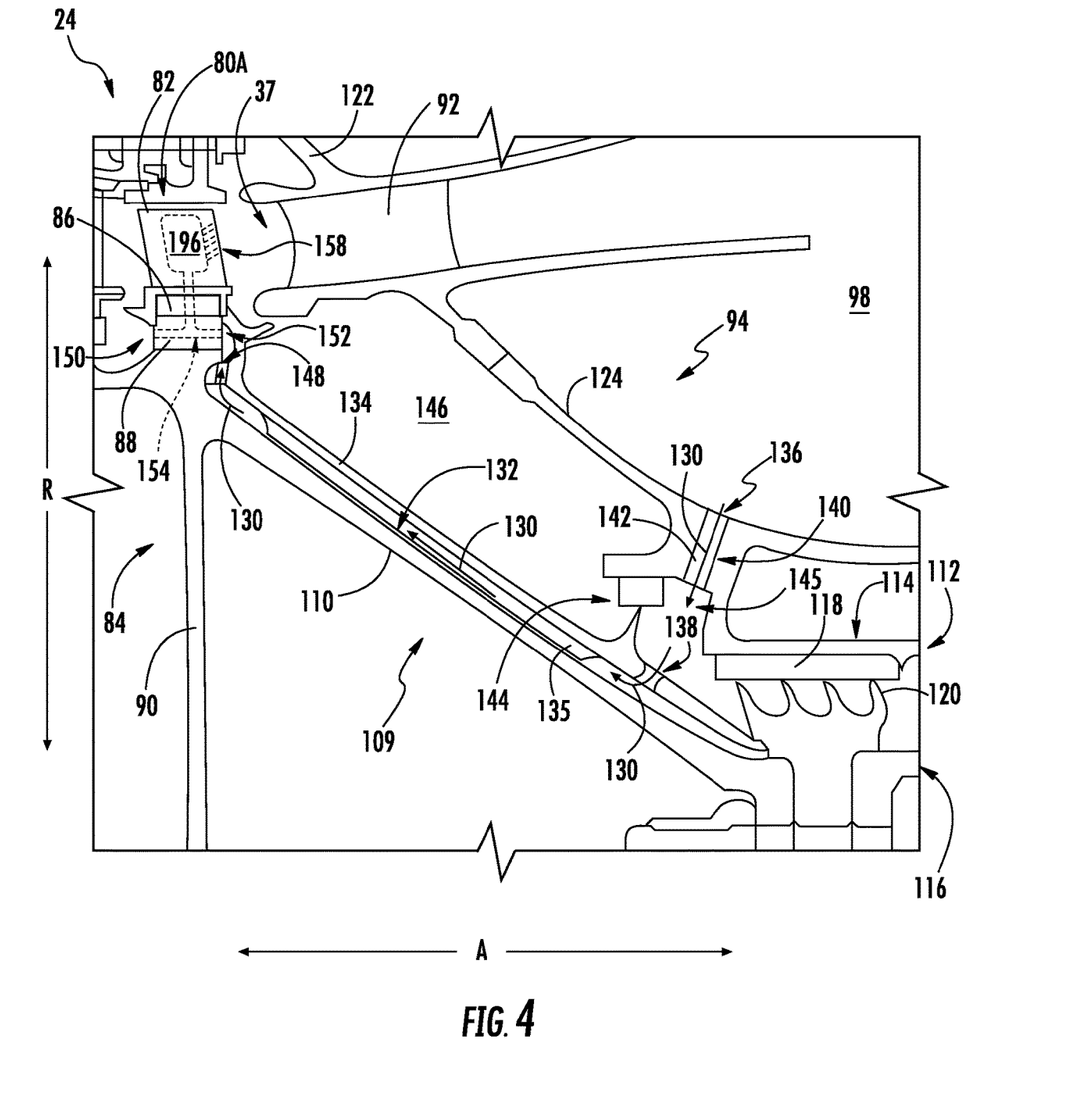
FIG. 4 is a close-up, cross-sectional, schematic view of an aft end of the compressor section and of a forward end of a combustion section in accordance with another exemplary embodiment of the present disclosure.

For example, referring now to FIG. 4, a close-up view of an aft portion of a compressor section and a forward portion of a combustion section 26 in accordance with another exemplary embodiment of the present disclosure is provided. The exemplary embodiment of FIG. 4 may be configured in substantially the same manner as the exemplary embodiment described above with reference to FIGS. 1 through 3.

For example, for the embodiment of FIG. 4, the turbofan engine 10 also defines a path for providing a cooling airflow 130 from a diffuser cavity 98 to an aft-most compressor stage 80A. More particularly, a combustion section 26 of the gas turbine engine of FIG. 4 includes an inner discharge nozzle case 124 defining a case opening 136. Additionally, a forward spool section 109 of an HP spool 34 includes a forward spool member 110 and a shield member 134 together defining an airflow cavity 132. The shield member 134 defines a spool opening 138 in airflow communication with the case opening 136 of the inner discharge nozzle case 124. An outlet 148 of the airflow cavity 132 is positioned adjacent to an aft end 152 of a rim 88 of a rotor 84 of the aft-most compressor stage 80A.

However, for the embodiment of FIG. 4, the rim 88 further defines a passage 154 extending from the aft end 152 of the rim 88 to a forward end 150 of the rim 88, with the airflow cavity 132 defined by the forward spool section 109 being in airflow communication with the passage 154 of the rim 88. With such a configuration, the cooling airflow 130 from the airflow cavity 132 may extend through the rim 88, cooling the rim 88. Further, the cooling airflow 130 may then reenter the core air flowpath 37, reducing a temperature of the airflow through the core air flowpath 37.

Additionally, for the embodiment of FIG. 4, the aft-most compressor stage 80A includes a plurality of HP compressor rotor blades 82. For the embodiment depicted, the plurality of HP compressor rotor blades 82 at the aft-most compressor stage 80A are configured as cooled HP compressor rotor blades. More specifically, the HP compressor rotor blades 82 each define an internal cavity 156 (depicted in phantom) in airflow communication with the airflow cavity 132 of the forward spool section 109. More specifically still, the HP compressor rotor blades 82 each define an internal cavity 156 in airflow communication with the airflow cavity 132 of the forward spool section 109 through a respective passage 154 defined in the rim 88 of the rotor 84 of the aft-most compressor stage 80A. For example, the rim 88 may define a plurality of passages 154 spaced, e.g., along a circumferential direction (i.e., a direction extending about the axial direction A), each of the passages 154 positioned inward of an HP compressor rotor blade 82 to provide cooling airflow 130 from the airflow cavity 132 to a respective internal cavity 156 of the HP compressor rotor blade 82.

Moreover, for the embodiment depicted, the plurality of HP compressor rotor blades 82 each further define a plurality of cooling air holes 158 to allow the cooling airflow 130 provided to the internal cavity 156 of the respective HP compressor rotor blade 82 to flow therethrough and reduce a temperature of the respective HP compressor rotor blade 82 during operation of the turbofan engine 10.

It should be appreciated, however, that in still other exemplary embodiments of the present disclosure, any other suitable configuration may be provided for, e.g., the HP spool 34, the support assembly 94 of the combustion section 26, the compressor rotor blades 82, the compressor rotor 84, etc. For example, in other exemplary embodiments, the airflow passage(s) 156 may not extend all the way to the forward end 150 of the rim 88, and may instead extend only to the airflow cavity 156 of the respective HP compressor rotor blade 82. Alternatively, in still other exemplary embodiments, one or more of the plurality of HP compressor rotor blades 82 may not define an internal cavity 156 or cooling air holes 158.

Moreover, in still other exemplary embodiments, still other configurations may be provided. For example, referring now to FIGS. 5 through 7, additional exemplary embodiments are depicted. Each of the exemplary embodiments of FIGS. 5 through 7 may be configured in substantially the same manner as exemplary embodiment described above with reference to FIGS. 1 through 3. For example, each of these the exemplary turbofan engines 10 similarly define a path for providing a cooling airflow 130 from a diffuser cavity 98 to an aft-most compressor stage 80A. More particularly, the combustion sections 26 of the gas turbine engines depicted each include an inner discharge nozzle case 124 defining a case opening 136. Additionally, a forward spool section 109 of each HP spool 34 includes a forward spool member 110 and a shield member 134. Moreover, the forward spool sections 109 each define an airflow cavity 132. The shield members 134 each define a spool opening 138 in airflow communication with the case opening 136 of the inner discharge nozzle case 124. An outlet 148 of each of the airflow cavities 132 is positioned adjacent to an aft end 152 of a rim 88 of a rotor 84 of the respective aft-most compressor stage 80A.

Figure 5:
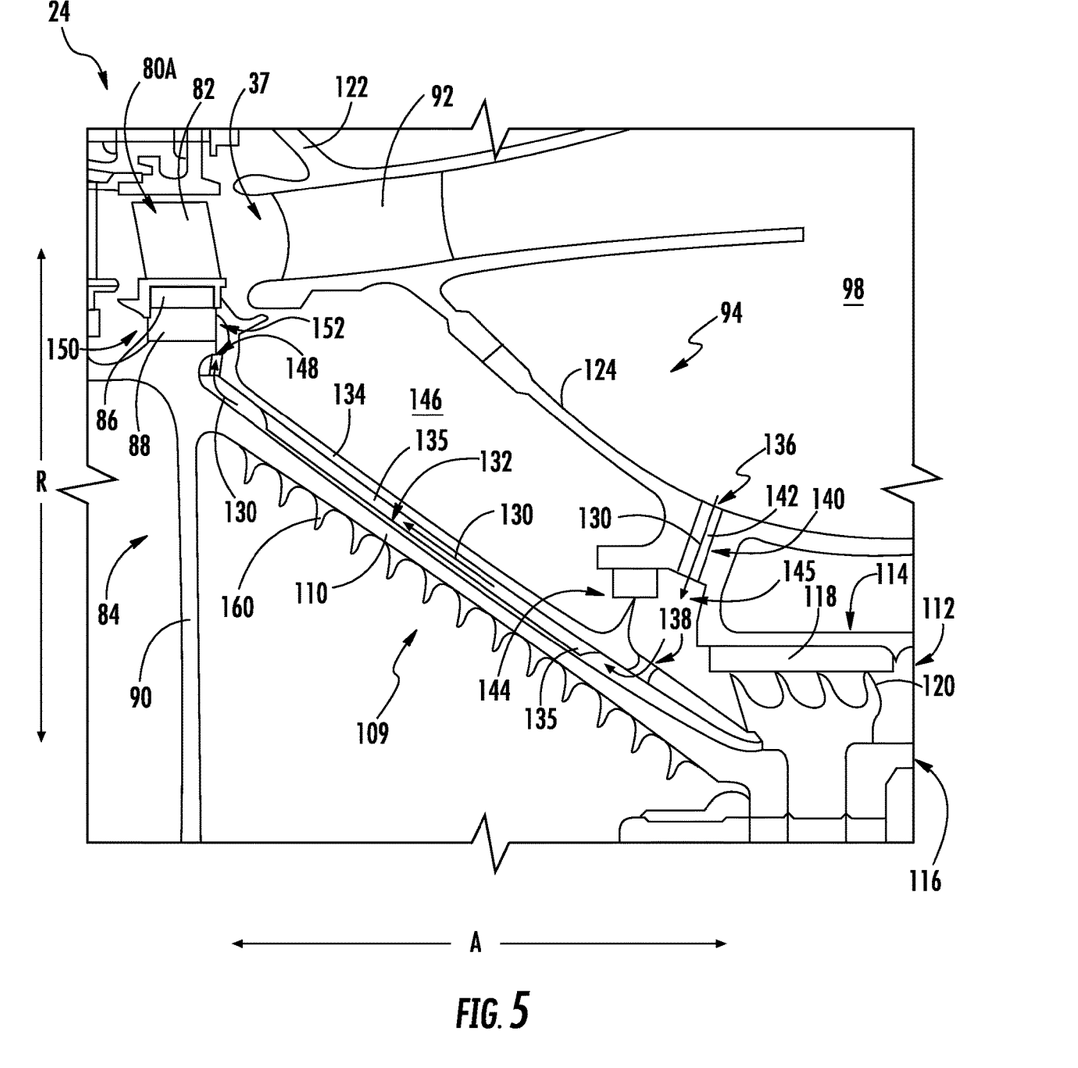
FIG. 5 is a close-up, cross-sectional, schematic view of an aft end of the compressor section and of a forward end of a combustion section in accordance with yet another exemplary embodiment of the present disclosure.

However, referring particularly to the exemplary embodiment of FIG. 5, the forward spool section 109 further includes one or more thermal transfer features for reducing a temperature of the forward spool section 109 during operation. More specifically, the forward spool member 110 of the forward spool section 109 includes one or more thermal transfer features on a surface opposite the surface defining at least in part the airflow cavity 132. For the embodiment depicted, these thermal transfer features are configured as a plurality of fins 160. However, in other exemplary embodiments, any other suitable thermal transfer feature may be provided. For example, in other exemplary embodiments, the one or more thermal transfer features may include pins extending from a surface of the forward spool member 110, dimples or other protrusions defined in a surface the forward spool member 110, etc.

Figure 6:
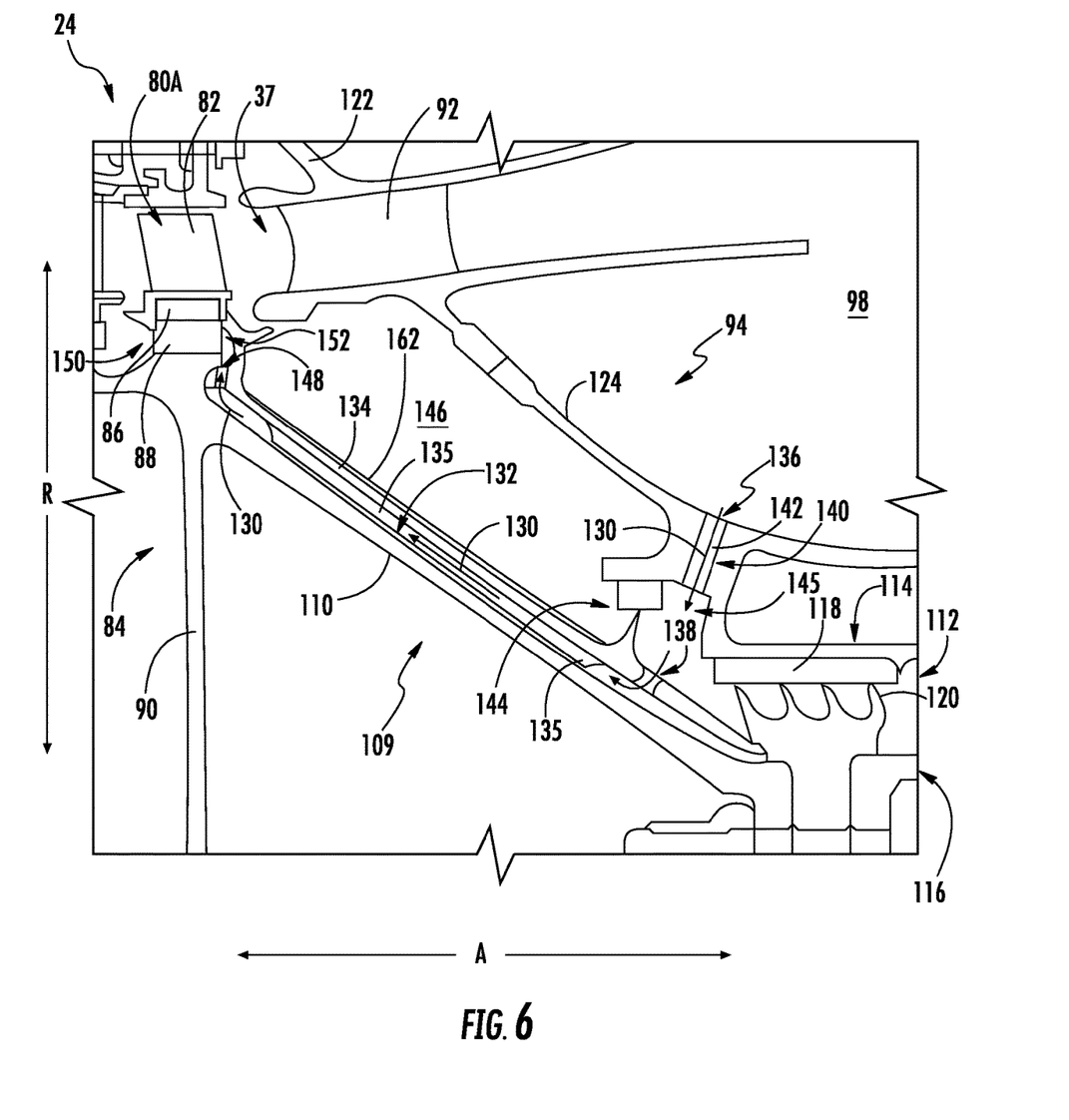
FIG. 6 is a close-up, cross-sectional, schematic view of an aft end of the compressor section and of a forward end of a combustion section in accordance with still another exemplary embodiment of the present disclosure.

Additionally, referring now particularly to the embodiment of FIG. 6, the forward spool section 109 includes one or more barriers to thermally isolate and/or thermally insulate the airflow cavity 132, or to otherwise protect one or more components of the forward spool section 109. More particularly, for the embodiment of FIG. 6, the forward spool section 109 includes an environmental barrier coating 162 on a surface of the shield member 134 opposite a surface defining at least in part the airflow cavity 132. More specifically, for the embodiment of FIG. 6 the forward spool section 109 includes the environmental barrier coating 162 on the surface of the shield member 134 exposed to the cavity 146. In certain exemplary embodiments, the environmental barrier coating 162 may be configured as a thermal barrier coating.

Figure 7:
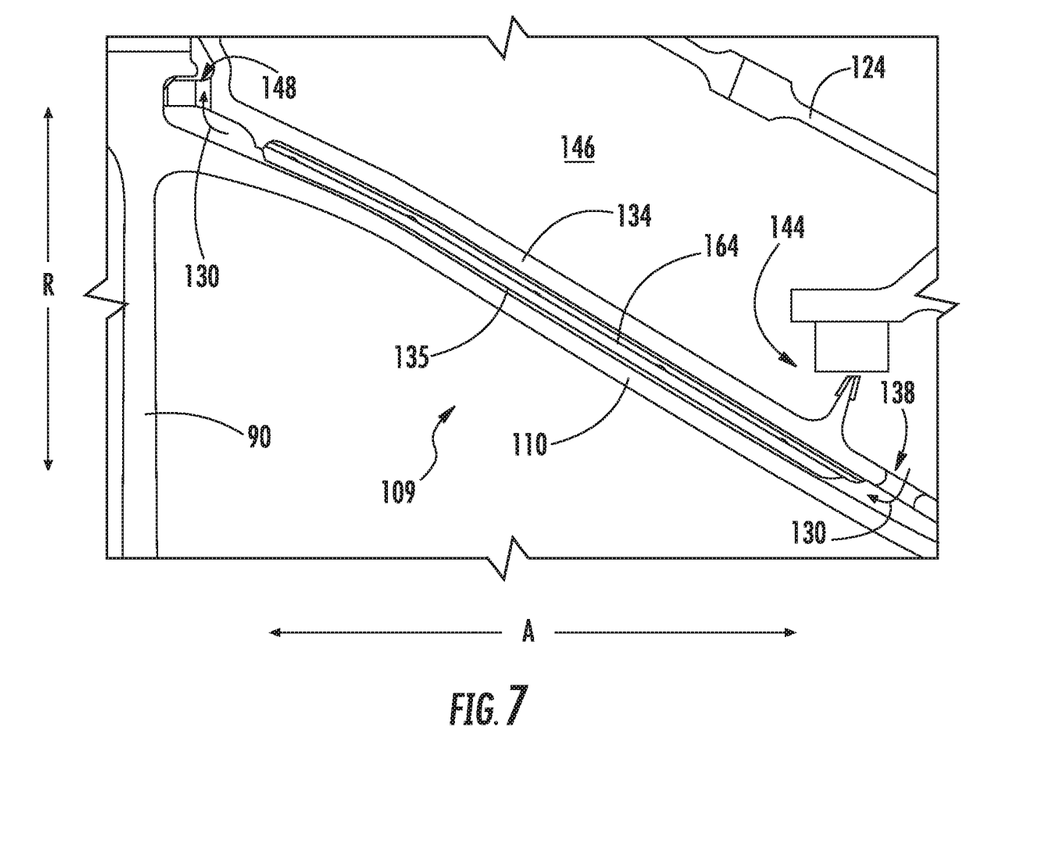
FIG. 7 is a close-up, cross-sectional, schematic view of a forward spool section of a spool of the gas turbine engine in accordance with another exemplary embodiment of the present disclosure.

Moreover, referring now particularly to the embodiment of FIG. 7, providing a close-up view of the exemplary forward spool section 109, the forward spool section 109 further includes additional features for thermally isolating or insulating an airflow 130 through the airflow cavity 132. More specifically, for the embodiment of FIG. 7, the forward spool section 109 further includes a thermal shield 164 positioned on an inside surface of the shield member 134. The thermal shield 164 accordingly at least partially defines the airflow cavity 132 for the embodiment depicted. The thermal shield 164 may be any suitable component for further thermally isolating or insulating the airflow 130 through the airflow cavity 132.

It should further be appreciated, that in other exemplary embodiments, any other suitable components or configuration may be provided.

Figure 8:
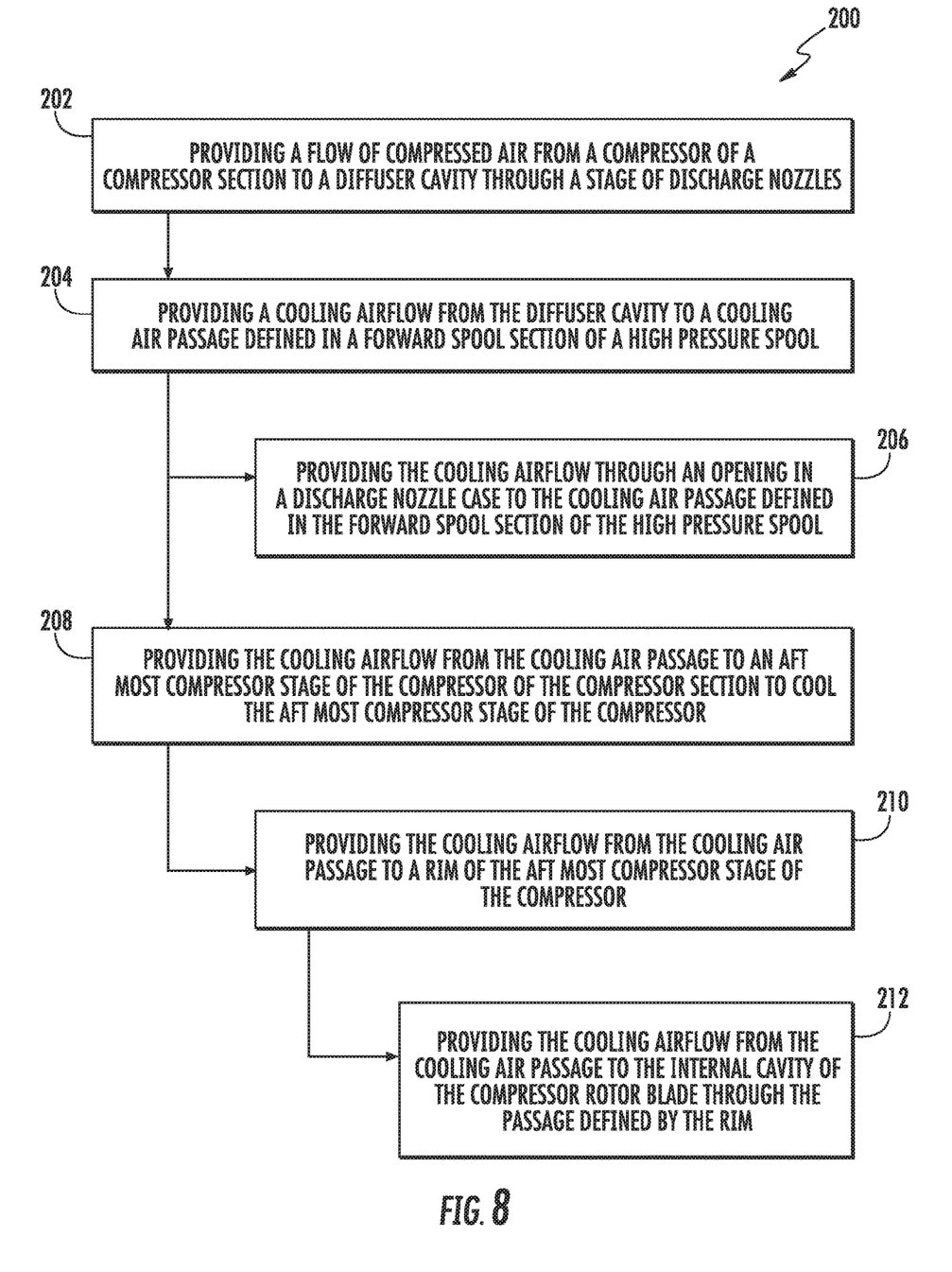
FIG. 8 is a flow diagram of a method for cooling a compressor of the gas turbine engine in accordance with an exemplary aspect of the present disclosure.

Referring now to FIG. 8, a method 200 of cooling a compressor of the gas turbine engine is provided. The method 200 may be utilized with a gas turbine engine configured in substantially the same manner as one or more the exemplary turbofan engines described above with reference to FIGS. 1 through 4.

As is depicted, the exemplary method 200 includes at (202) providing a flow of compressed air from a compressor of a compressor section to a diffuser cavity through a stage of discharge nozzles. In certain exemplary aspects, the compressor may be an HP compressor of the compressor section.

Additionally, the exemplary method 200 includes at (204) providing a cooling airflow from the diffuser cavity to a cooling air passage defined in a forward spool section of a high pressure spool, the high pressure spool drivingly connected to the compressor. More particularly, for the embodiment depicted, providing the cooling airflow from the diffuser cavity to the cooling air passage at (204) includes at (206) providing the cooling airflow through an opening in a discharge nozzle case to the cooling air passage defined in the forward spool section of the high pressure spool. In certain exemplary aspects, the discharge nozzle case may support the stage of discharge nozzles. For example, in certain exemplary aspects, the discharge nozzle case may be configured as an inner discharge nozzle case.

Further, the exemplary method 200 includes at (208) providing the cooling airflow from the cooling air passage to an aft most compressor stage of the compressor of the compressor section to cool the aft most compressor stage of the compressor. More particularly, for the exemplary aspect depicted, providing the cooling airflow from the cooling air passage to the aft most compressor stage of the compressor at (208) includes at (210) providing the cooling airflow from the cooling air passage to a rim of the aft most compressor stage of the compressor.

Furthermore, it should be appreciated, that in certain exemplary aspects, the method 200 may be utilized with cooled compressor rotor blades. For example, the rim of the rotor of the aft most compressor stage may define a passage extending from an aft end of the rim. Further, a compressor rotor blade of the aft most compressor stage may define internal cavity and a plurality of cooling holes in airflow communication with the internal cavity. With such an exemplary embodiment, providing the cooling airflow from the cooling air passage to the rim of the aft-most compressor stage at (210) includes at (212) providing the cooling airflow from the cooling air passage to the internal cavity of the compressor rotor blade through the passage defined by the rim.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining a radial direction and comprising:
   a compressor section comprising a high pressure compressor, the high pressure compressor comprising an aft-most compressor stage;
   a combustion section defining a diffuser cavity and comprising a stage of discharge nozzles supported by an outer discharge nozzle case positioned outward of the stage of discharge nozzles along the radial direction, the stage of discharge nozzles located downstream of the aft-most compressor stage and upstream of the diffuser cavity, and the stage of discharge nozzles supported by an inner discharge nozzle case positioned inward of the stage of discharge nozzles along the radial direction;
   a high pressure spool drivingly coupled to the high pressure compressor, the high pressure spool comprising a forward spool section and a central spool section that is radially inward of the combustion section; and
   a compressor discharge pressure seal formed in part by the central spool section and formed in part by the forward spool section, the central spool section extending aft from the compressor discharge pressure seal, the forward spool section extending forward from the compressor discharge pressure seal and the central spool section to the aft-most compressor stage;
   wherein the inner discharge nozzle case defines an opening forward of the compressor discharge pressure seal and the central spool section, the opening providing a cooling airflow to an airflow cavity for providing the cooling airflow from the diffuser cavity to the aft-most compressor stage, the compressor discharge pressure seal in contact with the cooling airflow,
   wherein the forward spool section comprises a forward spool member and a shield member, wherein the shield member is positioned adjacent to the forward spool member, wherein the shield member and the forward spool member together define the airflow cavity, the shield member rotatable with the forward spool member, and
   wherein the forward spool member further comprises one or more thermal transfer features on a surface opposite a surface defining, at least in part, the airflow.

2. The gas turbine engine of claim 1, wherein the combustion section further comprises a support assembly, at least a portion of the support assembly includes the inner discharge nozzle case positioned inward of the stage of discharge nozzles along the radial direction.

3. The gas turbine engine of claim 2, wherein the high pressure spool forms the compressor discharge pressure seal with the support assembly of the combustion section.

4. The gas turbine engine of claim 1, wherein the inner discharge nozzle case comprises an inducer positioned in the opening defined by the inner discharge nozzle case.

5. The gas turbine engine of claim 1, wherein the inner discharge nozzle case defines the opening for providing the airflow cavity of the forward spool section with the cooling airflow, and wherein the high pressure spool forms an auxiliary seal with the support assembly of the combustion section apart from the opening of the inner discharge nozzle case and the compressor discharge pressure seal.

6. The gas turbine engine of claim 1, wherein the aft-most compressor stage includes a rim, and wherein the shield member extends from the compressor discharge pressure seal to the rim of the aft-most compressor stage.

7. The gas turbine engine of claim 1, wherein the shield member defines an opening for receiving the cooling airflow from the diffuser cavity.

8. The gas turbine engine of claim 1, wherein the aft-most compressor stage includes a rim, wherein the rim defines a passage extending from an aft end of the rim, wherein the aft-most compressor stage comprises a compressor rotor blade, wherein the compressor rotor blade defines an internal cavity and a plurality of cooling holes, wherein the internal cavity of the compressor rotor blade is in airflow communication with the passage, and wherein the airflow cavity defined by the forward spool section is in airflow communication with the passage of the rim.

9. The gas turbine engine of claim 1, wherein the aft-most compressor stage includes a rim, wherein the rim defines a passage extending from an aft end of the rim to a forward end of the rim, and wherein the airflow cavity defined by the forward spool section is in airflow communication with the passage of the rim.

10. The gas turbine engine of claim 1, further comprising:
    a turbine section comprising a high pressure turbine, and wherein the high pressure spool is further drivingly connected to the high pressure turbine.

11. The gas turbine engine of claim 1, wherein the combustion section further comprises a support assembly, wherein the support assembly comprises the inner discharge nozzle case, and wherein the inner discharge nozzle case and the shield member together define, at least in part, a forward cavity.

12. The gas turbine engine of claim 11, wherein the forward cavity is in airflow communication with the aft-most compressor stage at a location upstream of the diffuser cavity.

13. The gas turbine engine of claim 1, wherein the forward spool section further comprises one or more thermally isolating features on a surface of the shield member.

14. A method of cooling a compressor of a gas turbine engine comprising:
    providing a flow of compressed air from the compressor of a compressor section to a diffuser cavity through a stage of discharge nozzles supported by an outer discharge nozzle case positioned outward of the stage of discharge nozzles along a radial direction and an inner discharge nozzle case positioned inward of the stage of discharge nozzles along the radial direction, wherein a combustion section comprises the diffuser cavity and the stage of discharge nozzles;
    providing a cooling airflow from the diffuser cavity to a cooling air passage defined in a forward spool section of a high pressure spool, the high pressure spool drivingly connected to the compressor, the high pressure spool further comprising a central spool section that is radially inward of the combustion section; and
    providing the cooling airflow from the cooling air passage to an aft-most compressor stage of the compressor of the compressor section to cool the aft-most compressor stage of the compressor;
    wherein the forward spool section comprises a forward spool member and a shield member, wherein the shield member is positioned adjacent to the forward spool member, and wherein the shield member and the forward spool member together define the cooling air passage, the shield member rotatable with the forward spool member;
    wherein a compressor discharge pressure seal is formed in part by the central spool section of the high pressure spool, the central spool section extending aft from the compressor discharge pressure seal, and the compressor discharge pressure seal is formed in part by the forward spool section, the forward spool section extending forward from the compressor discharge pressure seal and the central spool section to the aft-most compressor stage of the compressor; and wherein the inner discharge nozzle case defines an opening forward of the compressor discharge pressure seal and the central spool section, the opening providing the cooling airflow from the diffuser cavity to the cooling air passage, the compressor discharge pressure seal in contact with the cooling airflow, and wherein the forward spool member further comprises one or more thermal transfer features on a surface opposite a surface defining, at least in part, the cooling air passage.

15. The method of claim 14, wherein providing the cooling airflow from the cooling air passage to the aft-most compressor stage of the compressor comprises providing the cooling airflow from the cooling air passage to a rim of the aft-most compressor stage of the compressor.

16. The method of claim 15, wherein the rim defines a passage extending from an aft end of the rim to a forward end of the rim, and wherein the cooling air passage defined in the forward spool section is in airflow communication with the passage of the rim.

17. The method of claim 15, wherein the rim defines a passage extending from an aft end of the rim, wherein the aft-most compressor stage comprises a compressor rotor blade, wherein the compressor rotor blade defines an internal cavity and a plurality of cooling holes, and wherein providing the cooling airflow from the cooling air passage to the rim of the aft-most compressor stage comprises providing the cooling airflow from the cooling air passage to the internal cavity of the compressor rotor blade through the passage defined by the rim.

18. The method of claim 14, wherein providing the cooling airflow from the diffuser cavity to the cooling air passage defined in the forward spool section of the high pressure spool, comprises providing the cooling airflow through the opening in the inner discharge nozzle case inward of the stage of discharge nozzles along the radial direction to the cooling air passage defined in the forward spool section of the high pressure spool.

19. The method of claim 18, wherein the inner discharge nozzle case comprises an inducer positioned in the opening defined by the inner discharge nozzle case.

20. The method of claim 14, wherein the shield member defines an opening for receiving the cooling airflow from the diffuser cavity.

* * * * *